United States Patent [19]
Romanenko et al.

[11] 4,043,211
[45] Aug. 23, 1977

[54] APPARATUS FOR TRANSMITTING A COMMAND SIGNAL

[76] Inventors: Nikolai Trofimovich Romanenko, ulitsa Smolenskaya, 5/1, kv. 20, Kiev; Alexandr Vasilievich Chichin, prospekt Lenina, 1, kv. 201; Ivan Frantsevich Lyaskovsky, ulitsa Pobedy, 83, kv. 80, both of Kuibyshev; Vladimir Jurievich Melnik, ulitsa B.Lepse, 43a, kv. 54, Kiev; Nikolai Ivanovich Medinsky, ulitsa Mirnaya, 155, kv. 8; Valentin Matveevich Yakunin, prospekt Lenina, 1, kv. 143, both of Kuibyshev, all of U.S.S.R.

[21] Appl. No.: 626,207

[22] Filed: Oct. 28, 1975

[30] Foreign Application Priority Data

Oct. 28, 1974 U.S.S.R. .............................. 2070141

[51] Int. Cl.² ........................................... F16H 21/44
[52] U.S. Cl. ...................................... 74/110; 251/138
[58] Field of Search ........................... 74/110; 137/522; 251/138, 82

[56] References Cited

U.S. PATENT DOCUMENTS

| 802,945 | 10/1905 | Waterman | 251/138 |
|---|---|---|---|
| 1,873,405 | 8/1932 | Hodgkins | 251/138 |
| 2,806,654 | 9/1957 | Daly | 74/110 |
| 2,841,032 | 7/1958 | Gimson et al. | 74/110 |
| 3,076,630 | 2/1963 | Hammond | 251/138 |
| 3,170,322 | 2/1965 | Cavanaugh | 74/110 |

*Primary Examiner*—Samuel Scott
*Assistant Examiner*—Wesley S. Ratliff, Jr.

[57] ABSTRACT

The apparatus comprises a leverage including at least two parallel arms pivotally mounted at their central portions, having one pair of the ends threof spread by the end piece of a driving rod and actuated, for instance, by a solenoid. The opposite pair of ends of the arms is operatively connected with a driven rod by means of wedge type engagement. Rollers are interposed between the contact surfaces of the arms and the respective rods. The mechanism cuts down the amount of energy required for transmitting a command, offers fast action and reliability.

2 Claims, 2 Drawing Figures

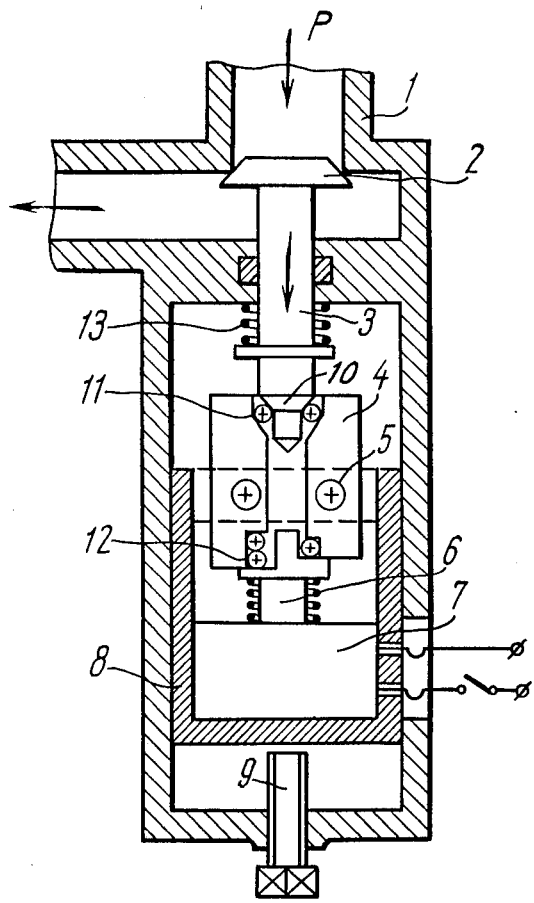
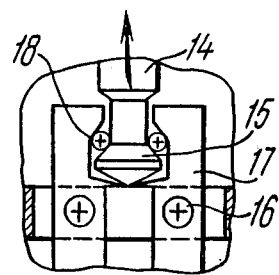
FIG. 1
FIG. 2

APPARATUS FOR TRANSMITTING A COMMAND SIGNAL

The present invention relates to apparatus for transmitting command signals, particularly, mechanical signals, such as a force or a displacement. For instance, the invention relates to electro-mechanical actuators featuring a translatory motion of the driving member and can be utilized for actuating fluid control valves in various fields of engineering, in chemical machinery, in aircraft, as well as in other industries.

There is known an electro-mechanical actuator of a fluid control valve, comprising a housing, a valve member with an actuating rod bearing upon two arms normally extending axially of the rod of the valve member, a solenoid with an armature displaceable normally with respect to the arms, the arms being pivotally interconnected at their central portions. With the coil of the solenoid energized, the armature pulls the central pivot of the arms and thus displaces the latter from their balanced or stable position, whereby the valve opens. (See, for example, the USSR Inventor's Certificate No. 136,611; Int. Cl. F 16 k 31/02, dated 1960).

A disadvantage of the known actuator is the relatively great force which must to be developed by the solenoid to effect actuation of valves rated for high pressures and having relatively large diameters, this relatively great force being necessitated by the friction in the pivotal connections. Furthermore, due to the relatively wide spread of the values of the friction factors, the performance of the known actuator is not adequately stable as far as the time of actuation is concerned.

It is, therefore, an object of the present invention to provide an apparatus for transmitting a command signal, which is capable of speeding up considerably the transmission of a force from one system with a mechanical output to another system, irrespective of the fact which particular device — electric, hydraulic or pneumatic — has initiated the input signal.

It is another object of the present invention to provide an apparatus for transmitting a command signal, which consumes minimal energy for transmission of a mechanical signal.

It is still another object of the present invention to provide an apparatus for transmitting a command signal, which has minimal dimensions.

Among other objects of the present invention is one of providing an apparatus of the abovespecified type, which is characterized by a versatile structure and reliability of operation.

These and other objects are attained in an apparatus for transmitting a command signal from a linearly displaceable driving member to a driven member displaceable in response to a command signal, in which apparatus, in accordance with the invention, the command transmission assembly comprises arms pivotally mounted at their central portions, one pair of the end portions of these arms being retainable in a normal position, either spread apart or brought together, by the end piece of the driving member, the opposite pair of the portions of these arms being in operative wedge-type engagement with the end piece of the driven member.

The abovedescribed features of the present invention provide for creating a mechanical actuator offering a mechanical system of facilitated and reliable action, combining exceptional simplicity with versatility of its applications and ensuring reliable transmission of a command signal with minimal energy consumption.

In accordance with an embodiment of the present invention, the apparatus is characterized in that the driving member and the driven member are axially aligned, axially displaceable rods having their end pieces facing each other, the command transmission assembly including at least one pair of arms whose pivot axes extend transversely of the axes of the rods, the driven rod being normally spring-urged to spread apart, by its wedge-shaped end piece, the adjacent end portions of the arms, the end piece of the driving member normally urging apart the opposite end portions of the arms, the end piece of the driving member, upon the latter being actuated through a command motion, causing pivoting of the arms and displacement of the driven member.

The last-mentioned features offer an optimal version of the herein disclosed apparatus, characterized by an optimal arrangement of the components and thus providing for the most compact structure of the command actuator. It is quite obvious that these general features may be incorporated in a variety of practical structures wherein, with the major principle of the invention being retained, the shapes and forms of the driving and driven members may be different, e.g. arms, cams, three-dimensional shapes, grippers and the like, and the angles of mutual orientation of these members may likewise be different, the selection of the exact shapes and angles being determined by the particular application of the apparatus.

According to a further embodiment, the apparatus is characterized in that intermediate rolling bodies are interposed between the wedge-shaped surfaces of the end piece of the driven rod and the end portions of the arms, adjacent thereto, similar rolling bodies being also interposed between the engagement surfaces of the opposite end portions of the arms and the end piece of the driving rod, urging them apart.

The above embodiment considerably reduces the internal losses of energy in the apparatus, caused by friction. Furthermore, with the sliding friction being replaced with rolling friction, the action of the apparatus becomes more fast and accurate.

According to a still further embodiment of the invention, invention, the disclosed apparatus is characterized in that the said rolling bodies cooperate with planar engagement surfaces of the arms and of the end pieces of the rods and are in the form of rollers indexed transversely of the common axis of the rods and parallel with the pivoting axis of the arms.

The last-mentioned embodiment of the present invention is structurally optimal, because the selection of the rollers for acting as the rolling bodies makes the apparatus capable of transmitting relatively great forces and loads, to say nothing of the roller system being stable and dependable in operation.

It should be also noted that by selecting various diameters of these intermediate rollers it is possible to vary the value of the initial strain in the engagement zones and thus to produce actuators acting in response to various command forces.

In accordance with a still further embodiment of the invention, the apparatus is characterized in that the end piece of the driven member is shaped as an inverted wedge tapering in a direction opposite to that toward the pivoting axis of the arms, the latter having their engagement end portions, adjacent to this end piece of the driven member, shaped as clamping jaws.

The last-mentioned embodiment of the invention offers a versatile structure of the disclosed apparatus, operable both with the driven rod being pushed and pulled.

Thus, when the present invention is utilized in an electromechanical actuator of a valve, it may be more convenient to have a system where the driven rod is pushed. On the other hand, e.g. in cases of utilization of the herein disclosed apparatus in mechanical engagement systems, it may be more convenient to have the driven rod pulled.

Finally, according to a still further embodiment of the present invention, the disclosed apparatus is characterized in that in the area of the engagement of the driving rod with the adjacent end portions of the arms, spread thereby, a single roller is located at one side of the end piece of this rod and two rollers are located at the opposite side thereof.

The last-described embodiment of the apparatus provides for stepping up the stability of the performance of the command signal transmission assembly by eliminating an eventual error caused by misalignment of the contact areas of the rollers located at the opposite sides of the end piece of the driving rod.

The present invention will be further described in connection with a preferred embodiment thereof, with reference being had to the accompanying drawings, wherein:

FIG. 1 illustrates schematically the structure of an apparatus for transmitting a command signal, embodying the invention; and FIG. 2 is modification of the signal transmission assembly shown in FIG. 1.

In the drawings, the apparatus is illustrated in the form of an embodiment for an electro-mechanical valve actuator.

The structure of the apparatus is illustrated in FIG. 1 of the appended drawings.

The electro-mechanical or solenoid actuator of a valve includes a housing 1, a valve member 2 with a driven rod 3, a pair of arms 4 pivoted about respective pivot pins 5 at their central portions. One pair of the end portions of the arms 4 clamp the armature 6 therebetween (i.e. the driving rod) of a solenoid 7. The arms 4 and the solenoid 7 are received within a carrier 8 mounted in the housing and adjustable with a screw 9.

The operating principle of the apparatus for transmitting a command signal embodied in the presently described actuators is, as follows.

With the valve closed, the driven rod has its bottom end piece, shaped as a wedge 10, bearing against the adjacent end portions of the arms 4. The armature or driving rod 6 clamped between the opposite end portions of the arms 4 does not let them pivot, and thus the rod 3 with the valve member 2 is retained immobile in the initial position.

When a command signal is supplied to the solenoid 7, the latter retracts armature 6 and thus releases the arms 4 which are now able to pivot about their pivot axes 5 and thus enable the driven rod 3 of the valve member 2 to move downwardly under the action of the pressure of the fluid and of the force of a compression spring 13 acting upon the rod 3.

To render the performance of the herein disclosed actuator more stable and fast, rollers 11 are interposed between the arms 4 and the rod 3, and either rollers or balls 12 are interposed between the arms 4 and the armature or driving rod 6.

The driven rod 3 may be not only pushed, as is the case in the embodiment illustrated in FIG. 1, but also pulled, as is the case in the modification shown in FIG. 2.

It has been found expedient that a single roller 12 should be located on one side of the driving rod, i.e. of the armature 6 and two such rollers 12 should be located on the opposite side thereof. With the engagement or contact areas of the rollers 12 thus arranged, eventual skewing of the (armature 6) rod 3 is prevented.

The herein disclosed actuator can be widely employed in various systems actuated upon receiving a predetermined command, e.g. in the valves of fire-extinguishing systems, in parachute release systems and the like.

In the modification of the actuator shown in FIG. 2, the driven rod 14 is pulled, its end piece or tip having an "inverted" wedge portion 15 tapering in the direction opposite to that toward the pivot axes 16 of the pivotable arms 17.

The end portions of the arms 17 are shaped as clamping jaws, with rollers 18 interposed between their engagement surfaces and the wedge-shaped portion 15 of the rod 14. This modification of the disclosed apparatus may be more convenient in connection and engagement mechanisms of mechanical systems.

The herein disclosed apparatus is characterized by a great versatility of both its structure and applications, enabling variations of the indexing of its components and their size.

What we claim is:

1. In an apparatus for transmitting a command signal from a linearly displaceable driving member to a driven member which is displaceable in response to the command signal, a command signal transmission assembly comprising two arms having pivotally mounted central portions and opposite end portions, one pair of the end portions of said arms straddling the driving member to be retained in a normal position, either spread apart or brought together, by said driving member, the opposite pair of the end portions of said arms being in operative engagement with said driven member to hold the same in position, said driven member having a wedge-shaped end piece, said arms engaging said wedge-shaped end piece in a wedged relation therewith, said driving member and said driven member being axially aligned and comprising axially displaceable rods with respective end pieces facing each other, said arm having pivot axes extending transversely of the axes of the rods, and resilient means acting on the driven member to urge the arms apart by said wedge-shaped end piece, said end piece of said driving member normally urging said opposite end portions of the arms apart, the driving member being displaceable by a command signal to produce pivoting of said arms and displacement of said driven member, intermediate rolling bodies interposed between the wedge-shaped surface of the end piece of the driven rod and the end portions of the arms adjacent thereto and further rolling bodies interposed between the engagement surfaces of the opposite end portions of the arms and the end piece of the driving rod, said rolling bodies cooperating with planar engagement surfaces of the arms of the end pieces of the rods, said rolling bodies being in the form of rollers extending transversely of the common axis of the rods and parallel to the pivot axes of the arms, and wherein in the area of the engagement between the driving rod and the adjacent end portions of the arms a single one of said rollers is located on one side of the end piece of said rod and two said rollers are located on the opposite side thereof.

2. An apparatus according to claim 1, wherein the end piece of the driven member is shaped as an inverted wedge tapering in a direction opposite to that toward the pivot axes of the arms, the latter having their engagement end portions, adjacent to the end piece of the driven member, shaped as clamping jaws.

* * * * *